(12) United States Patent  
Gibson

(10) Patent No.: US 8,829,874 B2  
(45) Date of Patent: Sep. 9, 2014

(54) ELECTRONIC DEVICE AND METHOD FOR DC-DC CONVERSION WITH LOW POWER MODE

(75) Inventor: Neil Gibson, Freising (DE)

(73) Assignee: Texas Instruments Deutschland GmbH, Freising (DE)

(*) Notice: Subject to any disclaimer, the term of this patent is extended or adjusted under 35 U.S.C. 154(b) by 197 days.

(21) Appl. No.: 13/597,107

(22) Filed: Aug. 28, 2012

(65) Prior Publication Data

US 2013/0063104 A1    Mar. 14, 2013

Related U.S. Application Data

(60) Provisional application No. 61/534,004, filed on Sep. 13, 2011.

(51) Int. Cl.
*G05F 1/40* (2006.01)
*H02M 3/158* (2006.01)
*H02M 1/00* (2006.01)
*H02M 3/156* (2006.01)

(52) U.S. Cl.
CPC .......... *H02M 3/1588* (2013.01); *Y02B 70/1466* (2013.01); *H02M 2001/0032* (2013.01); *H02M 3/156* (2013.01); *Y02B 70/16* (2013.01)
USPC .............................. 323/282; 323/271; 363/89

(58) Field of Classification Search
CPC ............. H02M 2001/0012; H02M 2001/0032; H02M 3/33507
USPC .................. 323/222, 225, 271–276, 282–299; 363/16–20, 132
See application file for complete search history.

(56) References Cited

U.S. PATENT DOCUMENTS

| | | | | | |
|---|---|---|---|---|---|
| 4,672,303 | A | * | 6/1987 | Newton | 323/285 |
| 5,912,552 | A | * | 6/1999 | Tateishi | 323/285 |
| 6,724,174 | B1 | * | 4/2004 | Esteves et al. | 323/224 |
| 7,279,877 | B1 | * | 10/2007 | Tseng | 323/284 |
| 8,278,895 | B2 | * | 10/2012 | Gardner et al. | 323/282 |

* cited by examiner

*Primary Examiner* — Rajnikant Patel
(74) *Attorney, Agent, or Firm* — William B. Kempler; Frederick J. Telecky, Jr.

(57) ABSTRACT

The invention relates to an electronic device and a method for DC-DC-conversion. The electronic device includes energizing switch and a commutating switch coupled at a switching node. The switching node is configured to be coupled to an inductor. The electronic device is configured to repeatedly suspend the regular synchronous switching of the commutating switch during a load detection period, to sense the voltage at the output node during the load detection period and to determine a high-load condition or a light-load condition of the DC-DC-conversion based on the sensed voltage at the output node.

6 Claims, 1 Drawing Sheet

ELECTRONIC DEVICE AND METHOD FOR DC-DC CONVERSION WITH LOW POWER MODE

CROSS-REFERENCE TO RELATED APPLICATIONS

This patent application claims priority from U.S. Provisional Application No. 61/534,004, filed Sep. 13, 2011, which is incorporated herein by reference in its entirety.

FIELD OF THE INVENTION

The invention relates to an electronic device and a method for DC-DC conversion, and more specifically to a low power mode for DC-DC converters.

BACKGROUND OF THE INVENTION

In order to preserve efficiency, DC-DC converters have to adapt to different load conditions. Therefore, many DC-DC converters are usually configured to distinguish light-load and high-load conditions. In a buck converter for example, under high-load conditions, the DC-DC converter typically operates in a continuous operation mode. Under high load conditions in continuous operation mode, the inductor current typically does not reverse. Under light-load conditions, DC-DC converters typically enter a "discontinuous" operation mode. In discontinuous operation mode, the DC-DC converter becomes only active when the output voltage falls below a certain threshold voltage level. The operation during this discontinuous mode is to recharge the output capacitor ideally without the inductor current reversing. DC-DC converters are often designed to change from continuous to discontinuous mode when load current reduces sufficiently to result in the reversal of the inductor current.

Step down DC-DC converters typically have an energizing switch (the high-side switch) and commutating switch (the low-side switch) which are coupled at a switching node. The function of the energizing switch is to energize the inductor from the power source. The function of the commutating switch is to commutate the inductor current when not being energized by the energizing switch. The switching node is coupled to the inductor. The two switches are driven by two non-overlapping clock signals having the same clock period. For a step-up converter, a reverse current through the inductor can be detected if both switches are turned off (non-conducting) while the voltage level at the switching node is sensed. However, in continuous operation mode, the energizing switch and the commutating switch are only turned off simultaneously during a short period of time which is only a fraction of the time of the clock period. Therefore, prior art solutions typically need an additional high speed comparator to detect the light-load condition, i.e. the reversal of inductor current. High speed comparators are rather complex and consume a substantial amount of power, in particular if the clock frequency for the DC-DC converters is rather high.

SUMMARY OF THE INVENTION

It is a general object of the invention to provide an electronic device and a method for DC-DC conversion having the capability to detect light-load conditions without the need of high speed comparators typically found in prior art solutions.

In an aspect of the invention, an electronic device for DC-DC conversion is provided. The electronic device comprises a energizing switch and a commutating switch. The energizing switch is coupled to the commutating switch at a switching node. The switching node is coupled to an inductor for implementing a DC-DC converter. The electronic device is configured to sense the output voltage of the DC-DC conversion. An output voltage control loop can be implemented. The output voltage (or a voltage derived from the output voltage, for example by a resistive divider) is compared with reference voltage level. The result of the comparison is then used for initiating a new conversion cycle. Typically a control loop adapts the duty cycle of the gate driving signals for the energizing and commutating switch in continuous operation mode (high-load condition). The electronic device can then be configured to occasionally but periodically suspend the regular synchronous switching of the commutating switch during the load detection period. Furthermore, the electronic device may then be configured to enter into a discontinuous operation mode, if the output voltage of the DC-DC conversion remains above a threshold level during the load detection period.

According to this aspect of the invention, the electronic device is configured to periodically (once during a plurality of clock cycles) switch off the synchronous rectifier. This is done during a complete cycle of the period of the clock signal used for the DC-DC conversion. Conventionally, the synchronous rectifier is used to commutate the inductor current as long as it is not being energized by the primary power supply. The power loss in the low resistance of the synchronous rectifier is typically much lower than power loss associated with a diode. However, the benefit of using a diode instead of a synchronous rectifier is that the current cannot reverse and once the inductor current returns to zero, the voltage on the capacitor is at its maximum and only decays under presence of a load current. Therefore, the switching node naturally is in a high impedance state and remains in the high impedance state in light-load conditions until the load causes the output voltage to fall below a certain threshold. The diode voltage drop provides that the losses due to the diode become substantial at low output voltages. Thus systems not employing a synchronous rectifier, but instead depending on a diode to commutate the inductor current during the non-energizing period, enjoy the benefit of an inherent light load pulse skipping mode. If a synchronous rectifier is used, the losses associated with the diode can be reduced. However, the disadvantage of using the synchronous rectifier is that the current in the inductor can reverse. This decays the output voltage on the capacitor very quickly and causes the start of a new switching cycle to be largely independent of the load. This means that under light-load conditions, this kind of DC-DC converters employing synchronous rectifiers cannot automatically enter the discontinuous mode but require additional high speed comparators for making the light-load decision. The various aspects of the invention provide that the DC-DC converter can periodically behave as a system with only a diode instead of a synchronous rectifier in order to automatically enter into the discontinuous mode. The synchronous rectifier is occasionally switched off This period of time during which the synchronous rectifier is not used as a synchronous rectifier is referred to as the load detection period. During the load detection period, the inductor current is not commutated by the synchronous rectifier, but supplied through the back gate diode of the commutating transistor of the synchronous rectifier. This provides that the system can automatically enter into the low power mode. The insufficiencies associated with the use of a diode are therefore reduced to a much smaller and acceptable level since the diode is only used occasionally. On the other hand, the benefit of using a synchronous rectifier is still available since it is used for the majority of conversion cycles.

The commutating switch may be a MOS transistor with a back gate diode configured to supply a current to the switching node during the load detection period dependant on the load condition.

The load detection period may have a duration of one clock cycle of the clock used for the DC-DC conversion. This provides sufficient time for the comparator to sense the voltage level at the output node. However, the losses and disturbances due to the time during which the synchronous rectifier is switched off are still small since this load detection time is only employed for a small fraction of conversion cycles.

The clock frequency may by 20 MHz, or more. If the clock frequency of the DC-DC conversion is increased, the requirements on the bandwidth of any comparator used in prior art solutions for sensing voltage levels at the switching node become more and more demanding. The invention is therefore particularly useful for DC-DC converters using rather high clock frequencies The energizing switch and the commutating switch are driven by a first clock signal and a second clock signal, respectively. These two clock signals are configured as non-overlapping clock signals having the same clock period.

The output voltage at the output node is continuously sensed during the load detection period similar to the sensing during continuous operation mode and discontinuous mode. The high-load or light-load condition is determined based on the magnitude of the sensed output voltage at the output node.

Prior art solutions sense the voltage at the switching node during the non-overlapping period of the clock signals. According to the aspects of the present invention, the output voltage is sensed during the load detection period (this can be a whole clock cycle in which the commutating switch is not switched on (it is not conducting)). However, the voltage control loop that is used for sensing the output voltage is already present in most DC-DC converter configurations. The requirements on the comparator are rather low.

The invention also provides a method for DC-DC conversion in which a synchronous rectifier is used. The regular synchronous switching of the commutating switch during a load detection period is repeatedly and/or periodically suspended during a load detection period. The output voltage at the output node is sensed during the load detection period and the high-load condition or the light-load condition of the DC-DC conversion is determined based on the sensed voltage level at the output node.

In an embodiment, the synchronous switching in continuous operation mode may be suspended every 8, 16 or 32 clock cycles. Using multiples of 2 reduces the overhead and complexity of the required control logic. Furthermore, the drawbacks of suspending the synchronous switching in continuous operation mode are reduced to ⅛, 1/16 or 1/32, respectively. However, other values can also be useful. In an embodiment, the electronic device may comprise a simple counter for periodically initiating the load detection period.

BRIEF DESCRIPTION OF DRAWINGS

Further aspects of the invention will appear from the appending claims and from the following detailed description given with reference to the appending drawings.

DETAILED DESCRIPTION OF AN EXAMPLE EMBODIMENT

Figure 1:
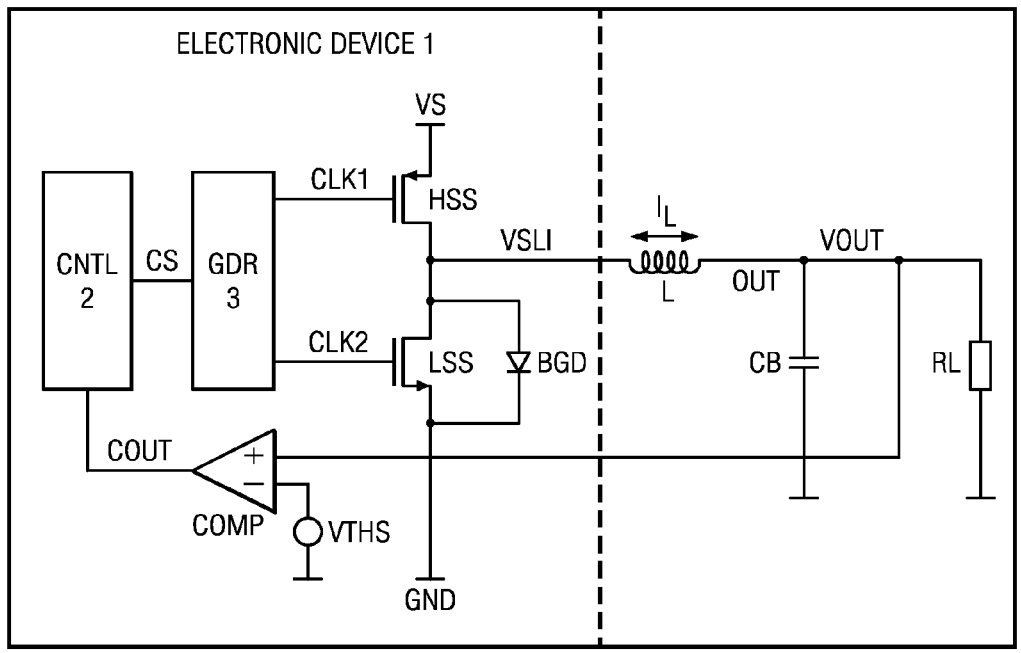
FIG. 1 shows a simplified circuit diagram of an electronic device according to to an embodiment of the invention.

FIG. 1 shows a simplified circuit diagram of an electronic device according to an embodiment of the invention. There is an electronic device 1 for DC-DC conversion. The electronic device comprises a control stage CNTL 2, a gate driving stage GDR 3, a energizing switch HSS (in this embodiment it is the high-side switch) and a commutating switch LSS (in this embodiment it is the low-side switch) and a comparing element COMP. The control stage CNTL 2 provides a control signal CS to gate driving stage GDR 3. Signal CS is a pulse width modulated signal. The gate driving stage GDR 3 produces two clock signals CLK 1 and CLK 2 for the respective gates of the energizing switch HSS and the commutating switch LSS. The commutating switch LSS forms the synchronous rectifier. In this embodiment, the energizing switch is a PMOS transistor and the commutating switch is an NMOS transistor. However, in other embodiments two NMOS transistors may be used. The commutating switch has a back gate diode BGD. The drain of the energizing switch HSS and the drain of the commutating switch LSS are coupled together at the switching node SW. The voltage level at the switching node SW is VSW. The source of the energizing switch HSS is coupled to a primary supply voltage VS and the source of the commutating switch LSS is coupled to ground GND.

In a typical configuration of a step down DC-DC converter, the switching node SW is coupled to an inductor L. The inductor L and the other components shown right from the dashed line may or may not be integrated on the same semiconductor electronic device together with the components shown left of the dashed line. The inductor L may then provide an inductor current IL to the output node OUT. The output voltage of the DC-DC converter is VOUT. This output voltage is applied to a load which is represented by a resistor RL in this illustrative example. There is further a buffer capacitor CB for buffering the output voltage VOUT. The output voltage VOUT may be sensed by the control stage CNTL 2. Furthermore, the current IL through the inductor may also be sensed although this is not further illustrated in FIG. 1.

During normal operation, the energizing switch HSS and the commutating switch LSS receive driving signals CLK 1 and CLK 2 at their control gates in order to alternately turn on either the energizing switch HSS or the commutating switch LSS. The gate driving signal CLK 1 and CLK 2 are non-overlapping clock signals having the same period.

The comparing element COMP, which may be a comparator or operational amplifier depending on the control system CNTL2, is coupled with a non-inverting input to the output node VOUT. The inverting input of the comparing element COMP is coupled to receive a threshold voltage level VTHS. The comparing element COMP is configured to sense the voltage level at the output node VOUT in order to determine whether it is lower than or greater than the threshold voltage VTHS. The previously described sensing of the output voltage is usually referred to as voltage control loop and corresponds to the conventional way of monitoring the output voltage. The present invention uses this voltage control loop.

During each $N^{th}$-clock cycle the commutating switch LSS is turned off (non-conducting). This clock cycle is referred to as the "load detection period". N may be 8, 16 or 32.

During each load detection period the output voltage VOUT is compared with the threshold voltage VTHS in comparing element COMP similar to the normal continuous operation mode.

During a load detection period the low side transistor (the synchronous rectifier) is switched off. The resulting change in the output voltage during this period depends on whether there is inductor current reversal in the non load detection periods. During a load detection period under high load conditions (whereby the inductor current is always positive during the non detection periods) the back-gate diode of the low side transistor will commutate the inductor current and pull the output voltage down. The comparing element responds to this by initiating a new conversion cycle. During a load detection period under low load conditions, (whereby the inductor current reverses during the non detection periods) the backgate diode of the low side transistor cannot commutate a negative inductor current and thus the output voltage remains at a peak level. The comparing element responds to this by not initiating a new conversion cycle, hence leaving the node VSW in a high impedance state. Thus the system is automatically in a power save mode without the need for a dedicated high speed comparator.

Furthermore, the control stage CNTL 2 is configured to determine each Nth clock cycle in order to initiate and perform a load detection period. The control stage CNTL 2 may include a counter for counting clock cycles of the main clock for DC-DC conversions in order to determine in which clock cycle the load detection should be performed.

Figure 2:
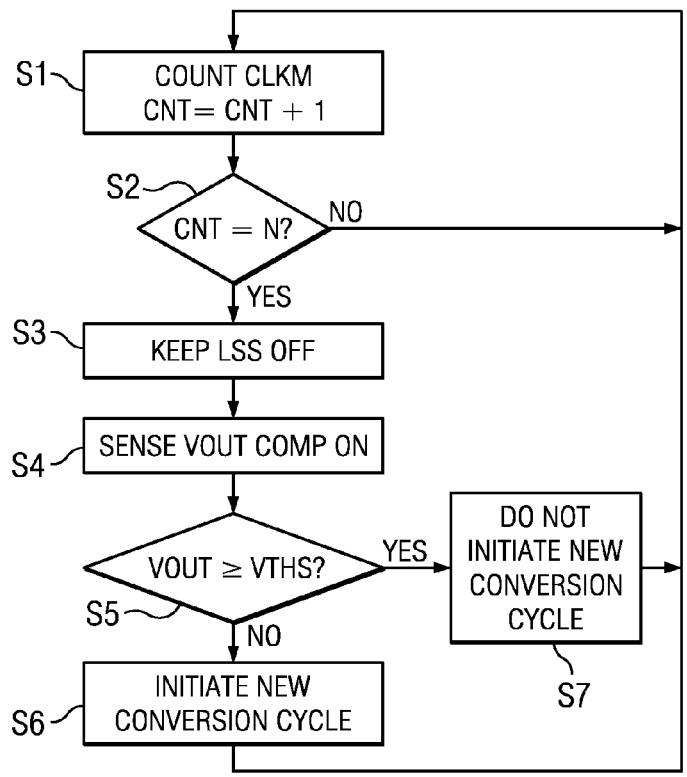
FIG. 2 is a flow chart illustrating the operation of the electronic device of FIG. 1.

FIG. 2 shows a simplified flow chart illustrating the operation of the electronic device according to aspects of the invention. In step S1 the clock cycles of the main clock CLKM are counted. This is indicated by an increase of one of the counter value CNT, as CNT:=CNT+1. If the count CNT is equal to N, which is determined in step S2, the low switch side LSS is turned off as indicated in step S3. If however, the count CNT is lower than N, the control stage CNTL 2 continues by counting the clock cycles of the main clock CLKM.

After step S3, in which the commutating switch LSS is turned off, the procedure continues with step S4. In step S4 the voltage level VOUT at the output node VOUT is sensed. The procedure continues in step S5, in which the comparing element COMP determines whether or not the voltage level VOUT is greater or equal to the threshold voltage level VTHS.

If the voltage level VOUT is lower than VTHS, the control stage configures the DC-DC converter to continue with a new conversion cycle in step S6. This means that the converter remains in continuous mode in step S6. Otherwise, if VOUT is greater than (or equal to) VTHS, the control stage proceeds with step S7 and does not initiate a new conversion cycle. This means that the DC-DC conversion is changed to discontinuous mode which is also referred to as burst mode. In other words, if in step S2, the count CNT is equal to N, the electronic device enters into the load detection period and determines either a high-load condition or a light-load condition by sensing VOUT and reacts on the respective condition by changing either to continuous mode or to discontinuous mode. The load detection period may be considered as a short test period of the discontinuous operation mode, in which by way of trial, the discontinuous operation mode is started. If the voltage control loop confirms that the discontinuous operation mode is indeed the correct operation mode for the current load condition, the discontinuous operation mode is automatically maintained. However, if the output voltage drops quickly during the load detection period, the voltage control loop triggers the DC-DC converter to return into continuous operation mode.

This embodiment relates to a stepdown converter, but the invention can also be applied to step-up converters.

Although the invention has been described in detail, it should be understood that various changes, substitutions and alterations can be made thereto without departing from the spirit and scope of the invention as defined by the appended claims.

The invention claimed is:

1. An electronic device for DC-DC-conversion comprising: a energizing switch and a commutating switch coupled at a switching node, the switching node being configured to be coupled to a first side of an inductor, wherein the electronic device is configured to operate in a continuous operation mode, in which the energizing switch and the commutating switch are synchronously, periodically and alternately switched on and off, and wherein the electronic device is further configured to periodically suspend the switching of the commutating switch during a load detection period, to sense the output voltage during the load detection period and to remain in a discontinuous operation mode for a light-load condition of the DC-DC-conversion based on the sensed output voltage.

2. The electronic device according to claim 1, wherein the commutating switch is a MOS transistor having a backgate diode configured to supply a current to the switching node during the load detection period dependent on the load condition.

3. The electronic device according to claim 1, wherein the load detection period has a duration of one clock cycle of the clock for DC-DC conversion.

4. The electronic device according to claim 1, wherein the energizing switch is driven by a first clock signal and the commutating switch are driven by a second clock signal and the first clock signal and the second clock signal are non-overlapping clock signals having the same clock period.

5. The electronic device according to claim 4, being further configured to determine the high-load condition and the light-load condition based on a comparison of the sensed output voltage level with a reference voltage level.

6. An method for DC-DC-conversion using a energizing switch and a commutating switch coupled at a switching node, the switching node being configured to be coupled to an inductor, the method comprising the steps of: repeatedly suspending the regular synchronous switching of the commutating switch during a load detection period, sensing the output voltage during the load detection period and remaining in a discontinuous operation mode for a light-load condition if the sensed output voltage remains above a reference voltage level during the load detection period.

* * * * *